United States Patent
Watson et al.

(10) Patent No.: US 7,436,630 B1
(45) Date of Patent: Oct. 14, 2008

(54) SYSTEM AND METHOD FOR REDUCING MICRO-DISCHARGE EVENTS IN A DATA STORAGE DEVICE

(75) Inventors: Mark Lee Watson, Louisville, CO (US); Kevin Dale McKinstry, Arvada, CO (US); Jeffrey Glenn Villiard, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 408 days.

(21) Appl. No.: 10/949,652

(22) Filed: Sep. 24, 2004

(51) Int. Cl.
*G11B 5/10* (2006.01)
*G11B 5/40* (2006.01)
(52) U.S. Cl. ...................................... 360/128; 360/323
(58) Field of Classification Search ................. 360/323, 360/128, 129
See application file for complete search history.

(56) References Cited

U.S. PATENT DOCUMENTS

| | | | |
|---|---|---|---|
| 6,005,736 A * | 12/1999 | Schreck | 360/75 |
| 6,498,913 B1 * | 12/2002 | Tooker et al. | 399/90 |
| 6,583,968 B1 * | 6/2003 | Scura et al. | 360/323 |
| 6,967,805 B1 * | 11/2005 | Hanchi et al. | 360/75 |
| 7,009,819 B2 * | 3/2006 | Soda et al. | 360/323 |
| 7,133,261 B2 * | 11/2006 | Biskeborn | 360/291 |
| 7,187,512 B1 * | 3/2007 | Wallash | 360/55 |
| 7,199,960 B1 * | 4/2007 | Schreck et al. | 360/75 |
| 7,248,438 B2 * | 7/2007 | Biskeborn et al. | 360/129 |
| 7,355,821 B2 * | 4/2008 | Suda | 360/323 |
| 2002/0097532 A1 * | 7/2002 | Voldman | 360/323 |
| 2003/0071885 A1 * | 4/2003 | Kamoshida et al. | 347/112 |
| 2003/0210501 A1 * | 11/2003 | Voldman | 360/323 |

* cited by examiner

*Primary Examiner*—Jefferson Evans
(74) *Attorney, Agent, or Firm*—Brooks Kushman P.C.

(57) ABSTRACT

A data storage device head having reduced media induced micro-discharge events. The data storage device head includes a support structure, and a wafer. A mitigation voltage, other than a ground potential, is presented to the wafer at a level sufficient to suppress media induced micro-discharge events.

13 Claims, 2 Drawing Sheets

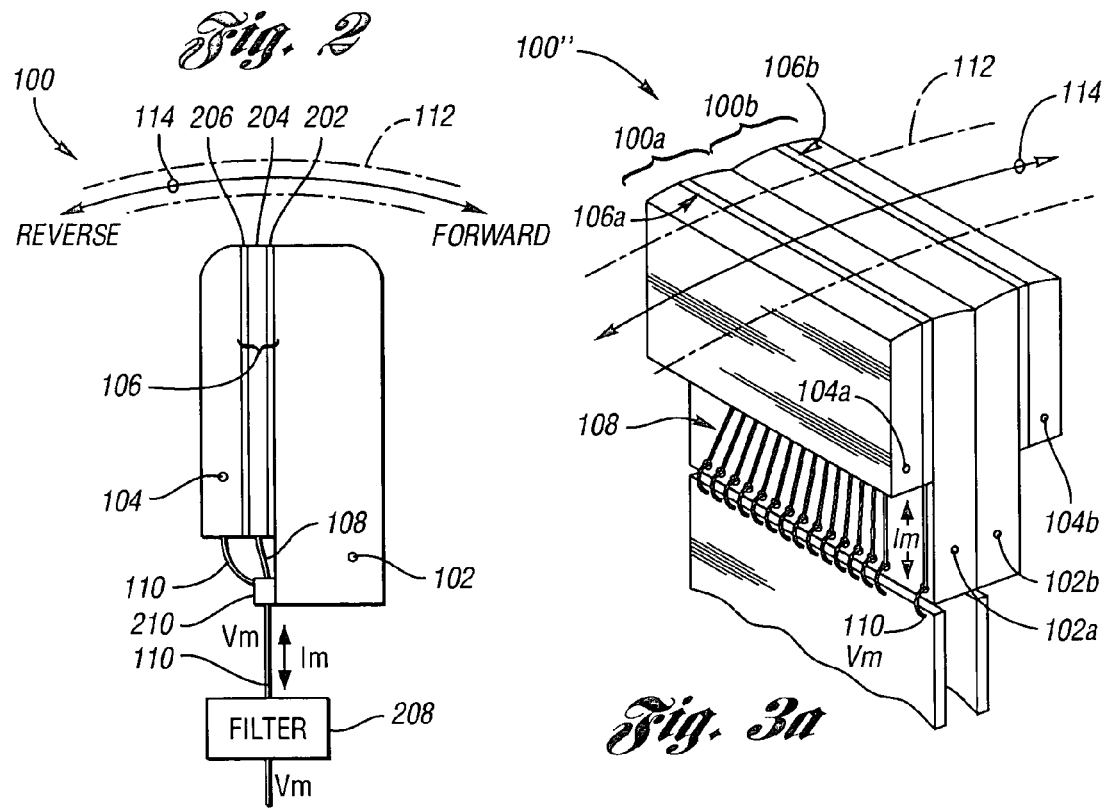
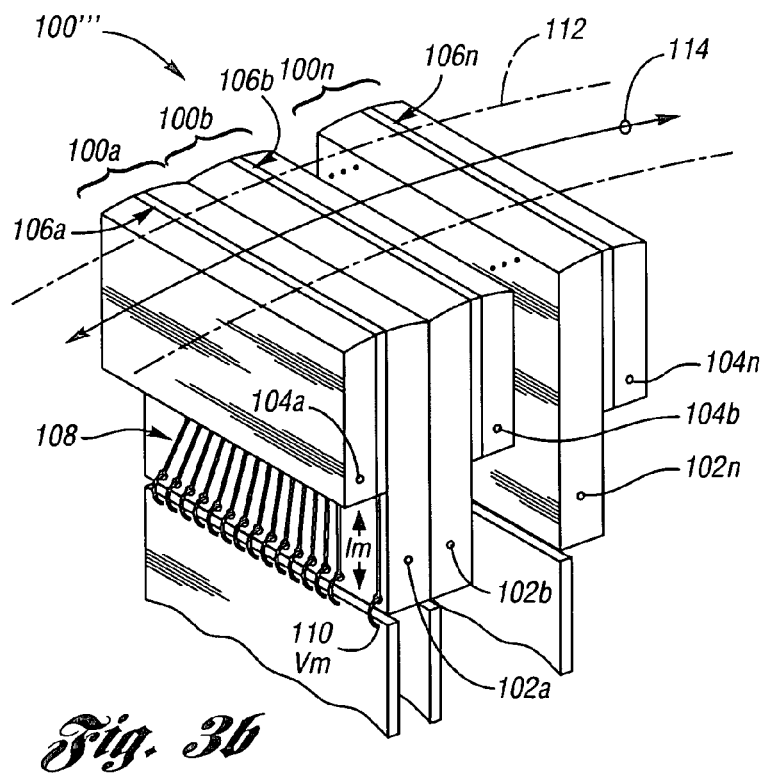

SYSTEM AND METHOD FOR REDUCING MICRO-DISCHARGE EVENTS IN A DATA STORAGE DEVICE

BACKGROUND OF THE INVENTION

1. Field of the Invention

This invention relates to a system and method for reducing media induced micro-discharge events in a data storage device.

2. Background Art

As the need for electronic data storage has increased, manufacturers of data storage devices (e.g., floppy disk drives, magnetic tape devices, flexible media storage devices, etc.) have sought ways to store more data in less physical space. In particular, manufacturers of flexible media storage devices (i.e., magnetic tape devices) have increased magnetic tape cartridge capacities by increasing the linear data density, the number of data tracks written across the width of the tape, and by extending the length of the tape contained within a data cartridge. Techniques to increase magnetic tape cartridge capacities typically use very thin magnetic media and minimal head to media separation.

Electro-static charges may build on data storage media when the media is exposed to friction. Friction often results from the media rubbing against itself and the media rubbing against drive components such as the head, guides, rollers, and the like. Because the storage media is generally a poor conductor, the electro-static charges can remain on the media until the media comes in contact with a path to ground. Studies of the data transfer (i.e., read/write) performance of magnetic data storage devices have indicated that small electric discharges (i.e., micro-discharges, triboelectric discharges, electro-static discharges, etc.) can occur between thin media sources and data storage device heads. Discharges that contact data transfer mechanisms (e.g., read sensors, write sensors, and the like) are particularly problematic because the discharge events are generally of sufficient amplitude and duration to hinder the data recordation/retrieval processes and may also damage the read/write sensors.

Conventional approaches for reducing problematic thin media induced micro-discharge events typically use grounding of the data storage device head (i.e., electrically coupling the head to a ground potential). However, conventional approaches have failed to sufficiently reduce the number of electro-static discharges at the data transfer mechanisms (e.g., read sensors, write sensors, and the like) to meet customer reliability and performance expectations.

Thus, it would be desirable to have a system and a method for reducing micro-discharge events at the data transfer mechanisms (i.e., read sensors, write sensors, and read/write sensors) of a data storage device. A reduction in such micro-discharge events may provide a corresponding reduction in data transfer errors. In addition, reducing micro-discharge events at the data transfer mechanism may provide less stress on the data storage head. Such a reduction in stress may provide an increase in the mean time between failures of the data storage head.

SUMMARY OF THE INVENTION

Accordingly, the present invention generally provides an improved system and an improved method for reducing micro-discharge events at data transfer mechanisms of data storage devices such that micro-discharge induced data transfer errors and premature head failures may be reduced or eliminated.

According to the present invention, a data storage device head having reduced media induced micro-discharge events is provided. The data storage device head comprises a support structure, and a wafer. The wafer is supported by the support structure and includes at least one data read/write device formed on a side of the wafer. A mitigation voltage, other than a ground potential, is presented to the wafer at a level sufficient to suppress media induced micro-discharge events.

Also according to the present invention, a method for reducing media induced micro-discharge events in a data storage device head is provided. The method comprises forming at least one read/write device on a wafer, and presenting a mitigation voltage other than a ground potential to the wafer at a level sufficient to suppress media induced micro-discharge events.

Still further according to the present invention, a data storage device head having reduced media induced micro-discharge events is provided. The data storage device head comprises a closure and a wafer. The wafer includes at least one data read/write device formed on a side of the wafer. The wafer side having the at least one read/write device is attached to the closure. A mitigation voltage, other than a ground potential, is presented to at least one of the closure and the wafer at a level sufficient to suppress media triboelectrically induced micro-discharge events on a data recording media prior to the media passing across the at least one read/write device.

These and other features and advantages of the present invention will be readily apparent upon consideration of the following detailed description of the invention in conjunction with the accompanying drawings.

BRIEF DESCRIPTION OF THE DRAWINGS

FIG. 2 is a diagram of a side view of a single bump data storage device head of the present invention;

FIG. 3a is a diagram of a two bump data storage device head of the present invention; and FIG. 3b is a diagram of a n-bump data storage device head of the present invention.

DETAILED DESCRIPTION OF THE PREFERRED EMBODIMENT(S)

Figure 1A:
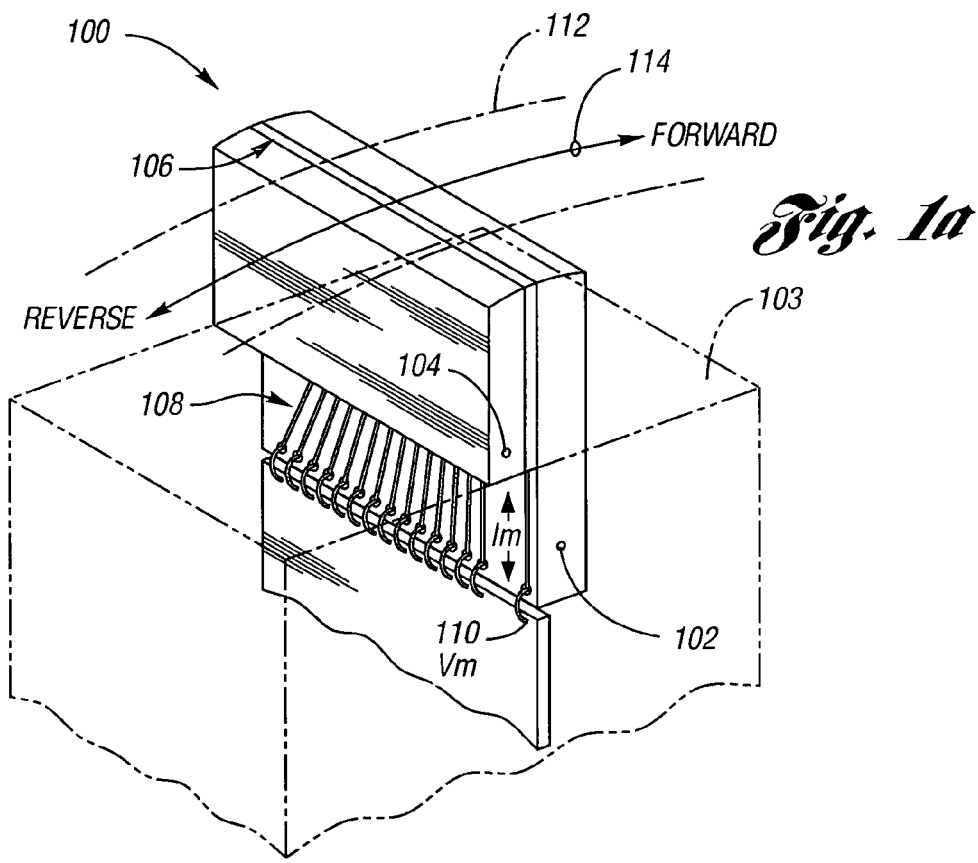
FIGS. 1a-1b are diagrams of single bump data storage device heads of the present invention.

Referring to FIG. 1, a diagram illustrating a single bump data storage device head 100 of the present invention is shown. The single bump device head 100 generally comprises a wafer 102, a support structure 103 (shown in phantom), a closure 104, at least one data read/write device (e.g., read device, write device, read and write device, and the like) 106, at least one data transfer conductor 108, and at least one mitigation voltage (e.g., Vm) conductor 110.

The wafer 102 is generally comprised of an electrically conductive, mechanically hard wearing material (e.g., AlTiC, and the like). At least one device 106 may be formed on one side of the wafer 102. The distance (i.e., separation, displacement, etc.) between the head 100 and the data recording media 112 may be reduced by contouring (i.e., shaping, smoothing, etc.) an edge of the wafer 102 that is nearest the recording media 112 during normal operation (i.e., the edge of the wafer that the media 112 passes across may be contoured to minimize the separation of the media 112 from the wafer 102).

The closure 104 generally comprises the same electrically conductive, mechanically hard wearing material as the wafer 102. The closure 104 may be attached to the data read/write devices 106 such that the devices 106 are disposed (i.e., located, positioned, fixed, placed, layered, etc.) between the wafer 102 and the closure 104. The distance between the head 100 and the data recording media 112 may further be reduced by contouring an edge of the closure 104 that is nearest the recording media 112 during normal operation.

The read/write device 106 generally comprises a plurality of thin film elements that are formed on a side of the wafer 102, and that are patterned and aligned to produce at least one of a read sensor structure and a write element. However, one skilled in the art of storage device head fabrication would recognize that the disclosed invention may be applied to a storage device head 100 without regard to the method by which the read/write device 106 is fabricated.

The head 100 is generally supported in a drive mechanism (not shown) by the support structure 103. The structure 103 is generally implemented as a gimbal assembly, a head actuator assembly, a head arm, and the like.

Data transfer conductors 108 may present signals (e.g., data, information, etc.) to and receive signals from the read/write device 106. In one example, the data transfer conductors 108 may be implemented as traces in a trace interconnect flex array. In another example, the data transfer conductors 108 may be implemented as dedicated metallic conductive wires (e.g., wires made of aluminum, copper, silver, gold, and the like). However, the data transfer conductors 108 may be implemented as any appropriate conductive material to meet the design criteria of a particular application.

A recording media 112 (shown in phantom) is generally implemented in connection with the head 100. During normal operation, the media 112 generally travels across the head 100 on a path 114 that crosses the wafer 102, the read/write device 106, and the closure 104. Data is generally written to and read from the media 112 via the read/write device 106. The media 112 generally travels (e.g., moves, passes, etc.) bi-directionally across (e.g., over, on, etc.) the head 100 (i.e., in a forward mode or direction and in a reverse mode or direction). The closure 104 generally forms a leading edge of the device head 100 when the media 112 travels in the forward direction. The wafer 102 generally forms the leading edge of the device head 100 when the media 112 travels in the reverse direction. However, the forward and reverse directions may be interchanged to meet the design criteria of a particular application.

One skilled in the art of storage device head fabrication, however, would recognize that the closure 104 may be omitted from the storage device head 100 (described in connection with FIG. 1b). When the closure 104 is omitted from the device head 100, the read/write device 106 generally forms a leading edge of the device head 100 when the media 112 travels in the forward direction. Conversely, the wafer 102 generally forms the leading edge of the device head 100 when the media 112 travels in the reverse direction.

A predetermined (e.g., selected, chosen, calculated, etc.) mitigation voltage (e.g., potential, electromotive force, etc.) Vm may be presented to the device head 100 such that micro-discharge events (i.e., triboelectric discharges, static electric discharges, and the like) that are generated (e.g., induced, produced, caused, etc.) by the media 112 passing across the head 100 during normal operation may be reduced or eliminated. The mitigation voltage Vm is generally presented at a potential other than a ground potential (e.g., a potential that may be positive with reference to ground potential, and, alternatively, a potential that may be negative with reference to ground potential).

The mitigation voltage Vm is generally presented at a level (i.e., amount, value, quantity, etc) sufficient to suppress micro-discharge events that are induced (i.e., generated, produced, etc.) due to motion of the media 112 over the head 100 during normal operation. In one example, the mitigation voltage Vm has a value within a nominal range of 0.1 volts to 30 volts, a preferred range of 0.5 volt to 10 volts, and a most preferred range of 1 volt to 1.5 volts. In another example, the mitigation voltage Vm has a value within a nominal range of −0.1 volts to −30 volts, a preferred range of −0.5 volt to −10 volts, and a most preferred range of −1 volt to −1.5 volts. However, the mitigation voltage Vm may be presented at any appropriate potential to meet the design criteria of a particular application.

The mitigation voltage Vm is generally applied (i.e., presented, etc.) to the device head 100. In one example, the mitigation voltage Vm may be applied to the closure 104 when the closure 104 forms a leading edge (i.e., when the media 112 travels in the forward direction) of the device head 100. In another example, the mitigation voltage Vm may be presented to the wafer 102 when the wafer 102 forms the leading edge (i.e., when the media 112 travels in the reverse direction) of the device head 100. In yet another example, the mitigation voltage Vm may be presented to both the closure 104 and the wafer 102. In yet another example, the voltage Vm may be presented to the support structure 103. However, the mitigation voltage Vm may be presented to any appropriate component of the device head 100 to meet the design criteria of a particular application.

The mitigation voltage Vm may be presented to a component of the device head 100 using at least one mitigation voltage conductor 110 (e.g., element, lead, trace, wire, apparatus, device, etc.). In one example, the mitigation voltage conductor 110 may be implemented as a trace in a trace interconnect flex array that is connected to the head 100 using, for example, a via. In another example, the mitigation voltage conductor 110 may be implemented in connection with the head support structure 103. In yet another example, the mitigation voltage conductor 110 may be implemented as a dedicated metallic conductive wire (e.g., a wire made of aluminum, copper, silver, gold, and the like). However, the mitigation voltage conductor 110 may be implemented as any appropriate conductor to meet the design criteria of a particular application.

The mitigation voltage Vm may be confined to the device head 100 by implementing electrically non-conductive (i.e., isolating, insulating) material (not shown) to prevent the device head 100 from having an electrically conductive path with structures (not shown) that are in close proximity to the head 100. The insulating material that is implemented to electrically isolate the head 100 may be implemented in connection with the support 103.

The level of the mitigation voltage Vm may induce an undesirable current flow (e.g., Im) through the conductor 110 unless other design criteria are appropriately determined. The magnitude (i.e., level, amount, etc.) of a current may be determined by a generally known formula I=V/R where I may be a current, V may be a voltage, and R may be a resistance (e.g., Im=Vm/R). For a constant mitigation voltage Vm, the current Im through the conductor 110 may be reduced by increasing the resistance R of the conductor 110. As such, increasing the resistance R may reduce the current flow Im through the head 100 when the mitigation voltage Vm is generally held constant.

In one example, the mitigation voltage conductor 110 may be implemented as any conductor 110 having sufficient resistance to limit the current flow Im to a maximum nominal value of (i.e., less than) 0.0001 amps (0.1 mA, 100 µA). In another example, the mitigation voltage conductor 110 may be implemented as any conductor 110 having sufficient resistance to limit the current flow Im to a maximum preferable value of 0.00001 amps (0.01 mA, 10 µA). In yet another example the mitigation voltage conductor 110 may be implemented as any conductor 110 having sufficient resistance to limit the current flow Im to a maximum most preferable value of 0.000001 amps (0.001 mA, 1 µA). However, the mitigation voltage conductor 110 may be implemented as any conductor 110 having sufficient resistance R to limit the current flow Im to any appropriate amperage value to meet the design criteria of a particular application.

The mitigation voltage conductor 110 may also be implemented as any conductor having sufficient resistance to limit the propagation (e.g., from the head 100 to a mitigation voltage Vm source) of spurious currents produced during micro-discharge events. Similarly, the mitigation voltage conductor 110 may include an electronic filter 208 (shown in detail in connection with FIG. 2) such that electrical noise may be reduced or eliminated.

Figure 1B:
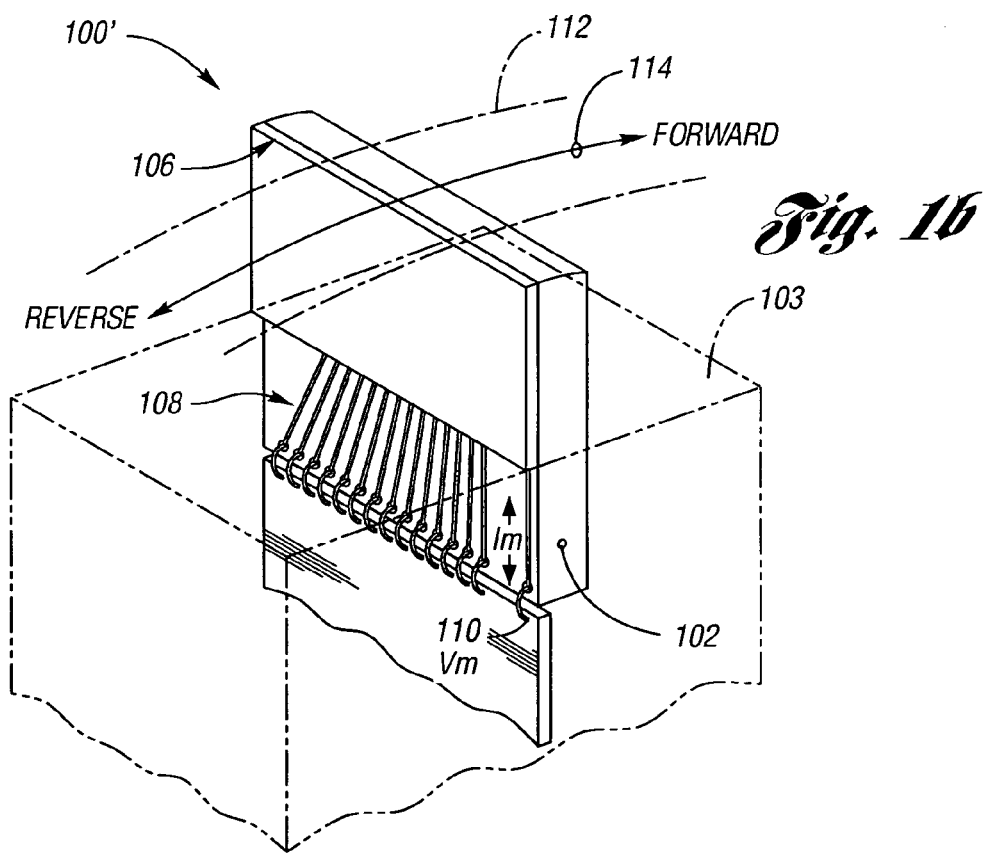

Referring to FIG. 1b, a design illustrating a device head 100' of the present invention is shown. The head 100' may be implemented similarly to the head 100 except that the closure 104 may be deleted in the head 100'.

Referring to FIG. 2, a diagram illustrating a side view of a single bump implementation of the data storage device head 100 is shown. The data read/write device 106 of the device head 100 is generally implemented as a thin film device. The device 106 may comprise at least one read/write structure 204 (i.e., read/write mechanism, read device, write device, read and write device, etc.), an insulating base 202, and an insulating cover 206. The at least one read/write structure 204 may be deposited on the insulating base 202.

The insulating cover 206 may be applied such that the read/write structure 204 resides (i.e., is located, disposed, positioned, etc.) between the insulating base 202 and the insulating cover 206.

The insulating base 202 may be applied (i.e., deposited, attached, fastened, affixed, adhered, bonded, etc.) to the wafer 102 and the insulating cover 206 may be adhered to the closure 104. The insulating base 202 and the insulating cover 206 generally are produced from the same insulating material and may act to electrically isolate (i.e. provide an electrically non-conductive barrier, electrically insulate, etc.) the read/write structure 204 from surrounding structures (e.g., the wafer 102, the closure 104, etc.).

The filter 208 may be serially connected between the source of the potential Vm (not shown) and the conductor 110. In one example, the filter 208 may have a first terminal (or input) that may receive the voltage Vm and a second terminal (or output) that may be connected to a pad 210. A first end of the conductor 110 may be connected to the pad 210 and receive the potential Vm. A second end of the conductor 110 may be connected to and present the mitigation voltage Vm to any one or more appropriate elements of the head 100 (e.g., the wafer 102, the closure 104, etc.).

Referring to FIG. 3a, a diagram illustrating a two bump (i.e., double bump) data storage device head 100" of the present invention is shown. The double bump device head 100" generally comprises a first device head 100a connected (i.e., attached, fixed, affixed, coupled, joined, etc.) to a second device head 100b. During normal operation, the media 112 generally travels across both heads (e.g., the heads 100a and 100b) on a path 114 that provides for data to be written to and read from the media 112 via both read/write devices (e.g., devices 106a and 106b). The media 112 generally travels bi-directionally across the heads 100 (i.e., in a forward mode or direction and in a reverse mode or direction).

In one example, the heads in a double bump configuration are connected by joining the wafer 102a of the first device head 100a to the wafer 102b of the second device head 100b. In another example, attachment of the head 100a to the head 100b may be accomplished by joining the closure 104a of the first device head 100a to the closure 104b of the second device head 100b. However, the first device head 100a and second device head 100b may be joined to form any appropriate configuration such that the media 112 generally travels (i.e., moves, passes, etc.) across both heads (e.g., heads 100a and 100b) on the path 114 such that data may be written to and read from the media 112 via the respective read/write devices (e.g., devices 106a and 106b).

Referring to FIG. 3b, a diagram illustrating a n-bump (i.e., multiple bump) data storage device head 100''' of the present invention is shown. The multiple bump device head 100''' generally comprises a first device head 100a connected (i.e., attached, fixed, affixed, coupled, joined, etc.) to a predetermined number of device heads (e.g., heads 100b-100n). During normal operation, the media 112 generally travels across the heads (e.g., the heads 100a, 100b-100n) on a path 114 that provides for data to be written to and read from the media 112 via the respective read/write devices (e.g., devices 106a-106n). Accordingly, the first device head 100a and subsequent device heads (e.g., the heads 100b-100n) may be joined to form any appropriate configuration such that the media 112 generally travels bi-directionally across the heads 100 (i.e., in a forward mode or direction and in a reverse mode or direction) such that data may be written to and read from the media 112 via the read/write devices (e.g., the devices 106a-106n).

As is readily apparent from the forgoing description, then, the present invention generally provides an improved apparatus (e.g., the data storage device head 100) and an improved method for reducing media induced micro-discharge events in a data storage device. The improved system and method of the present invention may provide a reduction in the number of data transfer (i.e., read/write) errors when compared to conventional approaches. Furthermore, the present invention may reduce the rate of premature head failures when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage device head having reduced media induced micro-discharge events, the data storage device head comprising:
    a support structure; and
    a wafer supported by the support structure, wherein the wafer includes at least one data read/write device formed on a side of the wafer, and a mitigation voltage other than a ground potential is presented to the wafer at a level sufficient to suppress media induced micro-discharge events and wherein the at least one read/write device is electrically insulated from the mitigation voltage.

2. The data storage device head of claim 1 wherein the mitigation voltage is presented through an electrical conductor that comprises at least one of a trace interconnect flex array, a head gimbal assembly, a head actuator assembly, and a dedicated conductive wire.

3. The data storage device head of claim 2 wherein the mitigation voltage is presented through an electronic filter and the filter is configured to reduce electrical noise that has been received by at least one of the electrical conductor and the read/write device.

4. The data storage device head of claim 1 wherein the mitigation voltage is presented through a conductor having a resistance sufficient to limit current through the conductor to nominally less than 100 μA, preferably to less than 10 μA, and most preferably to less than 1 μA.

5. The data storage device head of claim 1 wherein the mitigation voltage is negative with reference to the ground potential.

6. The data storage device head of claim 1 wherein the mitigation voltage is positive with reference to the ground potential.

7. The data storage device head of claim 1 wherein a plurality of wafers are joined together such that a data recording media travels across the at least one read/write device of each wafer on a path that provides for data to be transferred between the media and the read/write devices.

8. The data storage device head of claim 1 wherein the at least one read/write device includes at least one of a read structure and a write structure.

9. The data storage device head of claim 1 wherein the data storage device head is implemented in at least one of a flexible media storage application, a magnetic tape storage application, and a floppy disk drive application.

10. The data storage device head of claim 1 wherein the wafer is contoured to reduce separation between the at least one read/write device and a respective data recording media during normal operation.

11. A method for reducing media induced micro-discharge events in a data storage device head, the method comprising:
    forming at least one read/write device on a wafer; and
    presenting a mitigation voltage other than a ground potential to the wafer at a level sufficient to suppress media induced micro-discharge events wherein the data storage device head is electrically insulated.

12. The method of claim 11 further comprising fixing an insulating base and an insulating cover to the at least one read/write device such that the read/write device is electrically insulated from the mitigation voltage.

13. A data storage device head having reduced media induced micro-discharge events, the data storage device head comprising:
    a closure; and
    a wafer attached to the closure, wherein the wafer includes at least one data read/write device formed on a wafer side that is attached to the closure, and a mitigation voltage other than a ground potential is presented to the wafer, prior to a data recording media passing across at least one read/write device, at a level sufficient to suppress media triboelectrically induced micro-discharge events on the media.

* * * * *